United States Patent
Domenikos et al.

(10) Patent No.: US 6,240,442 B1
(45) Date of Patent: *May 29, 2001

(54) SYSTEMS AND METHODS FOR EXECUTING APPLICATION PROGRAMS FROM A MEMORY DEVICE LINKED TO SERVER AT AN INTERNET SITE

(76) Inventors: Steven D. Domenikos, 54 Myrtle St., Millis, MA (US) 02054; George C. Domenikos, 100 Boatswain Way #203, Chelsea, MA (US) 02150

( * ) Notice: Subject to any disclaimer, the term of this patent is extended or adjusted under 35 U.S.C. 154(b) by 0 days.

This patent is subject to a terminal disclaimer.

(21) Appl. No.: 09/192,951

(22) Filed: Nov. 16, 1998

Related U.S. Application Data

(63) Continuation of application No. 08/616,746, filed on Mar. 14, 1996, now Pat. No. 5,838,910.

(51) Int. Cl.[7] .................................................. G06F 15/16
(52) U.S. Cl. ...................... 709/203; 709/217; 709/219; 709/227; 709/245; 709/247; 707/10
(58) Field of Search ..................................... 709/203, 217, 709/219, 227, 245, 247; 707/10

(56) References Cited

U.S. PATENT DOCUMENTS 5,838,910 * 11/1998 Domenikos et al. ................ 709/203

* cited by examiner

Primary Examiner—Dung C. Dinh
Assistant Examiner—Hien C. Le
(74) Attorney, Agent, or Firm—Foley, Hoag & Eliot, llp; Robert A. Greenberg

(57) ABSTRACT

Systems and processes are disclosed that allow a computer to connect to a server of an Internet site for executing an application program that is stored on a disk linked to that server. Specifically, processes are disclosed that provide a data transport interface for connecting to the server, transport from the server a server address signal representative of a network address of the server, and a path name signal representative of a file system that includes an application program. The process further generates a mount request as a function of the path name signal and transports the mount request to the server to direct the server to provide an array of server file pointers that point to a file descriptor representative of the file system that includes the application program. The process generates an array of remote file pointers, as a function of the server address signal and the array of server file pointers, and provide the array of remote file pointers to a program loader that transports from the disk at the server site to a local program memory element, a file block associated with the selected remote file pointer.

12 Claims, 6 Drawing Sheets

SYSTEMS AND METHODS FOR EXECUTING APPLICATION PROGRAMS FROM A MEMORY DEVICE LINKED TO SERVER AT AN INTERNET SITE

This application is a continuation of 08/616,746, filed Mar. 14, 1996, now U.S. Pat. No. 5,838,910.

FIELD OF INVENTION

The present invention relates to systems and methods for connecting a computer to a computer network, and more particularly, to systems and methods for establishing a connection between a computer at a remote location and a server at an Internet site that allows the remote computer to execute applications stored at the Internet site.

BACKGROUND OF THE INVENTION

The digital computer is a powerful data processing tool that allows a user to organize, store and analyze data in volumes and at rates that would be impossible by any prior known technique. The computer network has been a similar step forward. By linking together several computers and by providing shared resources and cross-platform communications, engineers have developed the computer network into a tool that provides sufficient processing power to support entire corporations and universities. The increased power of computer networks over the individual microcomputer is provided by distributed processing. Distributed processing allows for the division or distribution of a computational workload among the different workstations connected to the computer network.

One of the most widely accepted and heavily used computer networks is the Internet. The Internet is a global system of interconnected computer networks formed into a single worldwide network. A user, through the Internet, can interactively transmit messages with users in different countries. Similarly, a user in the U.S. can access the files from libraries in Europe and Asia and download these files for personal use. Accordingly, the Internet computer network provides strong communication functions similar to the communication functions provided by ham radio operators. Moreover, the Internet computer network acts like a universal library, providing electronic access to resources and information available from Internet sites throughout the world.

Although the Internet provides excellent and developed resources for communication and file sharing, the Internet is still basically a static medium. In other words, the content of the Internet, i.e., the resources available to a user accessing a site on the Internet, contains mostly static information. Typically, a user moves about the Internet using a web browser program. The web browser program allows for multimedia presentation of information including text images, sound and video clips. This allows the user to connect via the Internet to different sites on the Internet. However, although a user can view the information stored at an Internet site, and even make a copy for his own personal use, at present, a user lacks a system for directly executing an application program via the Internet. As such, the Internet does not provide the general user the advantages of distributed processing.

In response to this problem, systems have been proposed that provide for application programs that move fluidly between an Internet site that stores the application program and an Internet site that services a user wishing to use that application program. One such proposed system is the JAVA system proposed by Sun Microsystems. The JAVA system provides an interpretive language system that can be operated by the Internet user to download and run small application programs, referred to as applets, located at a remote Internet site. Accordingly, the JAVA system allows for a form of distributed processing in that application programs located at Internet sites are being made available to Internet users. This is a significant advance over the prior functions available to Internet users which previously were limited to merely viewing and transferring information.

However, although JAVA offers an improvement over the prior art, the JAVA system suffers from some significant drawbacks. First of all, the JAVA system requires that each application stored at an Internet resource site that will be downloaded to an Internet user and run at the Internet user's site, to be written in a specific programming language that is compatible with the JAVA system. Therefore, available program applications such as Microsoft Word, Microsoft Excel, Intuit Quicken, or other developed application programs must be rewritten in a JAVA compatible programming language before it can be employed with the JAVA system. This of course creates an immediate barrier to the deployment of application programs across the Internet. Moreover, a significant debugging effort will be required as these rewritten applications are not proven code and inevitably will fail either due to bugs created during the rewriting of the program or bugs created by the JAVA system. Moreover, the proposed JAVA system is an interpreted language system. An interpreted language system is inherently slow. Accordingly, applications such as Microsoft Word or Microsoft Excel, which normally are not interpreted programs, must now be rewritten to function in an interpreted environment. Accordingly, Internet users are likely to notice a substantial decrease in operation speed while they run these applications. Additionally, JAVA applications available for deployment from an Internet site are programmed specifically for Internet deployment. Accordingly, these JAVA application programs will not be programs conventionally used by users at the Internet site that locally stores the JAVA application program. Accordingly, it is likely that users at the Internet application site will operate non-JAVA programs which are different from those JAVA programs deployed over the Internet. Accordingly, a compatibility rift develops between Internet users at remote sites and Internet users at the host sites. As such, the JAVA system inherently provides a barrier between users at remote locations and users at host sites.

Accordingly, it is an object of the present invention to provide systems that allow for deployment and execution of application programs across the Internet without downloading the application code into the storage memory of the user client system.

It is a further object of the present invention to provide systems that highly integrate remote users with the Internet network of the host site.

It is still a further object of the present invention to provide systems that deploy existing program applications across the Internet, without having to rewrite the applications.

It is still a further object of the present invention to provide a system for deploying applications across the Internet that provides systems which execute more quickly at remote sites.

These and other objects of the present invention will be made apparent from the following description of the invention.

SUMMARY OF THE INVENTION

Systems and processes according to the invention allow a computer, typically referred to as a client, to connect to a server of an Internet site for executing an application program that is stored on a disk linked to that server. In one aspect, the invention can be understood as processes for allowing a client computer at a remote location to execute application programs stored at an Internet site, including the steps of providing a data transport interface for connecting to the server, transporting from the server a server address signal representative of a network address of the server, and a path name signal representative of a file system that includes the application program, generating a mount request as a function of the path name signal and transporting the mount request to the server for directing the server to provide an array of server file pointers that point to a file descriptor representative of the file system that includes the application program, generating an array of remote file pointers, as a function of the server address signal, the path name signal, and the array of server file pointers, providing the array of remote file pointers to a program loader element operating on the client, and directing the program loader to select one of the remote file pointers and to transport from the disk at the server site to a local program memory element, a file block associated with the selected remote file pointer.

In one embodiment of the invention, the client computer transports to the server a client-type signal that represents a file system protocol which is employed by that client computer. In a further step, the process provides the server with an administration program for storing a file system of computer files on the disk according to a select file system protocol. As described in greater detail herein, the administration program can include a program element that stores computer files according to one or more of a DOS, UNIX, VMS, WINDOWS, WINDOWS 95, WINDOWS NT, OS/2, SYSTEM 7, MacIntosh, or any other commercial, or proprietary file system protocol.

The term "client", as used herein, encompasses any data processing system suitable for operating a process according to the invention and for establishing a communication link to an Internet site. An Internet site can be any process running on a data processing platform that connects into the Internet and that receives access requests, whether under http, ftp or any other conventional or proprietary transfer protocol. The term "application program" as used herein, encompasses any computer file that contains data in a format for being accessed and processed by the processing unit of a client system. The term "disk" as used herein, encompasses any memory device that can store computer data and that provides an interface for accessing the stored data.

The term "file system" as used herein encompasses logical structures that define the relationship between files, directories, disks, devices and ports that are stored on or linked to a computer system, and include file systems of directory structures that define the hierarchical relationship between stored files, disks, disk partitions, file blocks, devices or other sources of computer data. The term "file system protocol" as used herein includes the protocol for describing the relationship of files, directories, sub-directories, devices, disks, or other file system primitives.

The term "server address signal" as the term is used herein, encompasses any descriptor that identifies a network address of a server. The term is understood to include any descriptor for an Internet address of a server including any host number, any host name, any domain name or any other descriptor sufficient to identify the network address of a server. The term "path name signal" as used herein encompasses any descriptor suitable for providing an operating system with information for identifying one or more components of a file system including a file, a directory, a sub-directory, a device, a port or any other directory primitive.

The administration program can include a partitioning means for generating a disk partition for storing a file system of computer files according to a select file system protocol. In this way, the administration program can maintain a disk that has several partitions, each of which represents a logical storage device that stores application programs according to a specific file system protocol. This allows the administration program to employ the client-type signal transported from the client to the server to detect a file system protocol being employed by the client, and to determine which disk partition employs a compatible file system protocol, and therefore contains application programs which are suited for execution by the client. Similarly, the administration program can employ the client-type signal to determine which disk partition stores computer files of executable code that are compatible with the process or system of the client. Accordingly, the administration program can include an element that employs the client-type signal to select one of several local disk partitions that includes a file system of computer files that, when mounted into the file hierarchy of the server can be accessed and executed by the client computer.

In a further embodiment of the invention, the administration program includes a file directory element for generating directory information signals representative of the file system of computer files, or the computer files, stored on the disk, and for transporting the directory information signals to the client for providing a file directory of the computer files available to be accessed by the client. In one embodiment, this file directory element includes a page element for generating a page signal representative of the directory information signals. Typically, the page signal is a conventional HTML web page that provides, in a graphical format, the directory structure of the file system being accessed by the client computer. Preferably the page element has a hypertext link element which generates hypertext link signals representative of the primitives of the directory information signals. Such primitives can include files, directories, subdirectories, disk drives, or any other logical or physical structure of a file system. A server according to this embodiment provides a hypertext link of the directory structure of the file directory being accessed. Accordingly, the page element provides or generates one or more page signals in response to a link signal generated by the client. Typically the link signal is generated by the client activating a hypertext link signal portrayed on the graphical user interface provided by the page element. Such a link signal typically provides a URL signal to a web server process that provides the document associated with that URL. In this way, the hypertext link element is responsive to the link signals to generate further page signals, such as a subdirectory page signal, that represents the subdirectory of the file system of the computer files. Accordingly, in one preferred embodiment of the invention, the system provides a hypertext file directory structure that allows a user to traverse the file system mounted into the server file hierarchy, thereby allowing the client computer to access selected application programs stored at the server site.

In a further embodiment of the invention, the process includes the step of providing a client management element for generating a client file having information signals representative of at least one characteristic of the client and for providing that client file to the transport interface for transporting the client file to the server. For example, in one aspect the client management element generates an information signal that represents the client program memory size. The client program memory size can be understood to indicate the size of program memory available for storing executing program codes. This program memory size can include a signal representative of the total amount of program memory available on the system, as well as the total amount of program memory available for a process to be executed on the client system.

Moreover, the client management element can include an element for generating an information signal that represents a computer file stored in a memory device of the client. Accordingly, the client management element can include a configuration element that generates an information signal representative of one or more computer files that are stored on the client system. This information provides the server with the system file configuration of the client. The server can employ this system file configuration information to determine if the executable code requested by the client already exists as a program file stored on the client system. Based upon this information, the server can determine whether or not to instruct the client to access the client's local memory for executing this application program.

In a further embodiment, the process can include the further step of transporting to the server a client privilege signal representative of a preassigned access right granted to the client. Further, the process can include the further step of providing the server with a file access control program for determining, as a function of this client privilege signal, a set of file systems of computer files available to be mounted by the client. Accordingly, processes of the invention can employ a client privilege signal to determine the access rights which are available to each client. This allows a process according to the invention to control and license the deployment of application programs as well as providing a security system for preventing unauthorized clients from mounting file systems into the file hierarchy of the server or for executing application programs to which rights have been restricted.

In a further embodiment, processes according to the invention can include a data transport interface that includes a data compression element for compressing file blocks that are being transported from the server disk. In one embodiment of the invention, the data compression element is a data compression program that employs Huffman encoding for compressing the file blocks of executable code being transported from the server disk under the direction of a client program loader system. Further, the processes according to the invention can include the further step of providing the server with a caching element for caching a plurality of file blocks being transported from the disk. In one embodiment, the caching element is a caching program that reads plural file blocks from the server disk independent from instructions from the program loader. Each cached file block is placed in the high access speed memory, such as RAM, and is made available to the data transport interface upon a download request made by the program loader. In this way, the process of the invention can anticipate download requests from the program loader to reduce the file block access time and thereby increase the execution speed of applications running on the client system. In a further embodiment of the process, the process provides a data transport interface that includes a TCP/IP data transport system.

As will be described in greater detail hereinafter, the process according to the invention further includes the step of generating a request to dismount a file system from the hierarchy of the server. Accordingly, in one process according to the invention after the client computer exits or ends the execution of a selected application program, the process of the invention generates a dismount request and provides the dismount request to the data transport interface which transports the dismount request to the server which implements the dismount request to remove the mounted file system from the file hierarchy of the server.

In a further aspect, the invention can be understood as systems for allowing a client to execute an application program stored on a disk that is linked to the server of an Internet site. The system of the invention can include a data transport interface for connecting to the server, a connection element for collecting from a server the server address signal representative of a network address of the server and a path name signal representative of a file system that includes the application program, a mount element for generating a mount request as a function of the path name signal and for providing the mount request to the data transport element to direct the server to provide an array of server file pointers that point to a file descriptor representative of the file system that includes the application program, and a file handle element for generating an array of remote file pointers as a function of the server address signal, the path name signal, and the array of server file pointers, and a program loader element that has means for selecting one of the remote file pointers and for transporting a file block associated with that selected remote file pointer from the disk to a local program memory element.

In one embodiment of the invention, the file handle element includes a concatenation means for concatenating the server address with the path name signal and with the server file pointers to generate one of the remote file pointers.

In a further embodiment of the invention the client includes an identification program for generating a client-type signal and for providing the client-type signal to the data transport interface for transporting the client-type signal to the server. The identification program can include an Id element for generating a client Id signal which is representative of a unique identifier for that client. Further, the identification can include a configuration detection element for generating a configuration signal which represents the system configuration of the client.

In a further embodiment of the invention the system can include a server element that has an administration program for storing on the disk at least one file system of computer files stored according to a selected file system protocol. One such administration program can include means for storing a file system of computer files according to one or more of a DOS, UNIX, VMS, WINDOWS, WINDOWS 95, WINDOWS NT, OS/2, or SYSTEM 7 file system protocol. In a further embodiment of the invention, the system can include a connection element that includes an element for generating a call to a port of a server HTDP process. For example, the connection element can include a connection program that generates a call to the port 80 of the server process. Port 80, a well known port, provides the Internet address of the server operating the process coupled to the client system.

In a further embodiment of the invention, the server includes a file sharing program. Preferably the file sharing program is NFS compliant in that the file sharing program creates an array of file pointers, such as the Unix vnode which can be understood as an array of pointers to computer files stored on the server system.

In a further embodiment, the system according to the invention can include a dismount file system program for releasing mounted file systems.

In yet another embodiment of the invention the client element includes an element for running the application program being executed on the client, within a window of the network interface program.

These and other embodiments of the invention will be more clearly understood by reference to the following detailed description and attached drawings, in which like reference numbers refer to like elements.

DETAILED DESCRIPTION OF THE INVENTION

The invention comprises, inter alia, systems and methods for connecting a client to a server of an Internet site for allowing the client to access, deploy, and execute application programs stored at the server site. In one aspect, the invention is understood as a file management system that identifies the server's network address and the path name to a file system of computer files. The system of the invention employs the server network address and the file system path name to dynamically mount the file system of computer files. The mounted file system can be a file system stored on a memory device, such as a disk partition, that is linked to the server. The dynamic mount process integrates the specified file system the into the existing file hierarchy of the server.

The system of the invention provides the client access to the files by directing the server to generate an array of file pointers, typically file handlers, that provide entry points to the computer files of the mounted file system. The system directs the server to transport a copy of the server file handles to the client. The client can employ the file handles, the server network address and the server file system path name to generate an array of remote file pointers that can be passed to the client program loader to access file blocks of executable computer code from the server.

In operation, the program loader process running on the client employs the remote file pointers as entry points for executing one or more of the application programs stored within the server memory device. The program causes the transport of file blocks of executable code of the application program to the local memory of the client and the code is executed from local memory. In this way, a memory device located at an Internet site is incorporated into the network of a remote client as a network drive, and the client can launch and execute application programs from this mounted network drive to run as a network application.

The invention will now be explained with reference to certain illustrative embodiments, which are exemplary and not to be understood as a limiting, or an exhaustive representation of the invention.

Figure 1:
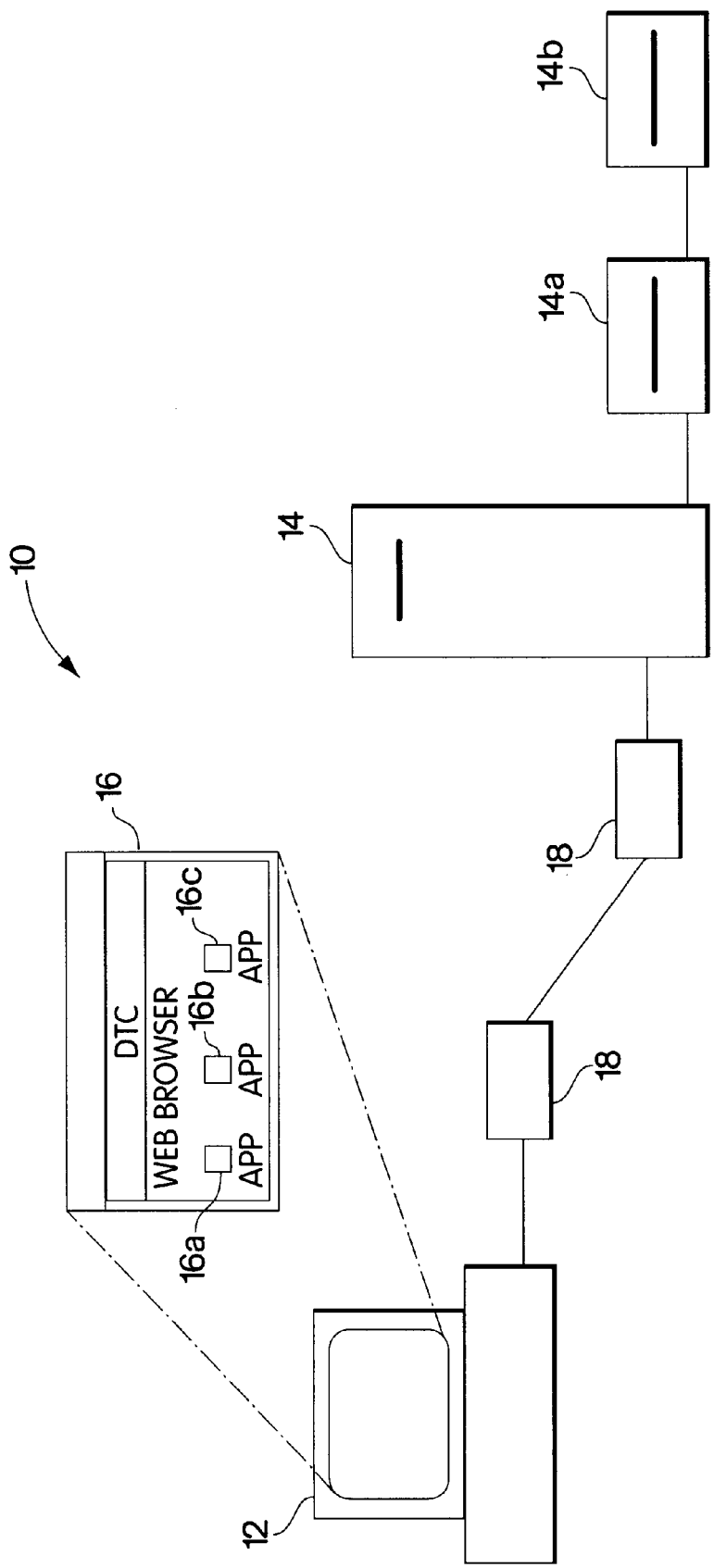
FIG. 1 illustrates one system according to the invention for establishing a connection to an Internet site and for executing application programs located at that site.

FIG. 1 depicts a system 10 according to the invention for accessing, deploying, and executing application program stored at drive of an Internet site. As illustrated in FIG. 1 the system 10 includes a client element 12, an Internet server element 14, memory devices 14a and 14b, an optional program interface 16, optional application icons 16a, 16b and 16c, and the communication elements 18.

The client element 12 depicted in FIG. 1 is an Internet client, and can be a commercially available PC compatible computer, Unix workstation or any other data processing system suitable for running the file system of the invention as a process and for operating a communication interface that provides an Internet communication link with an Internet site. Moreover, the client 12 can be a stand alone computer system or a networked computer system, and the memory devices 14a and 14b can be local memory storage for the server or can be remote storage that is linked to the server 14. The client 12 includes a telecommunications element 18, such as a modem, and also includes an Internet browser program, such as the Netscape Internet browser, which is suitable for establishing a connection to an Internet site. In the embodiment depicted by FIG. 1, the browser preferably provides an optional graphical interface 16 that allows a user to control and direct the operation of the system 10 to access and execute selected files. In the depicted embodiment, as will be explained in greater detail hereinafter, the system 10 integrates into the browser interface 16 an application icon element 16a that provides an access device for a user to activate an associated application program stored at server 14.

FIG. 1 further depicts an Internet site that includes a server element 14 that connects to the communications element 18 and the memory devices 14a and 14b. The server 14 can be any server element suitable for maintaining an Internet site that can be accessed by a client like client 14. Typically the server 14 is a data processing system that runs one or more server processes for maintaining an Internet site that includes one or more files for network access. In the embodiment depicted in FIG. 1, the server 14 connects to two memory devices 14a and 14b, depicted as external disk drive systems. Each disk drive system can maintain a set of computer files, including files of executable application program code, which the server can access and control. In the depicted embodiment of FIG. 1, the server 14 is a stand alone computer system, however, the server can also be a networked computer system, having one or more data processors that can access local or networked memory devices.

Typically, each memory device 14a and 14b is a hard disk system, or a partition of a hard disk system, a RAM card system, or computer RAM memory. However, it will be apparent to one of ordinary skill in the art of computer engineering that any memory device suitable for storing data and for interfacing to a data processor or a computer network can be practiced with the present invention, without departing from the scope thereof.

The communications elements 18 are figuratively depicted as modems for maintaining a telecommunication link between the client 12 and the server 14. However, the communication elements can also be ISDN devices, fiber optic devices, cable devices or any other type of communication device suitable for establishing a communication link to a remote site.

Figure 2:
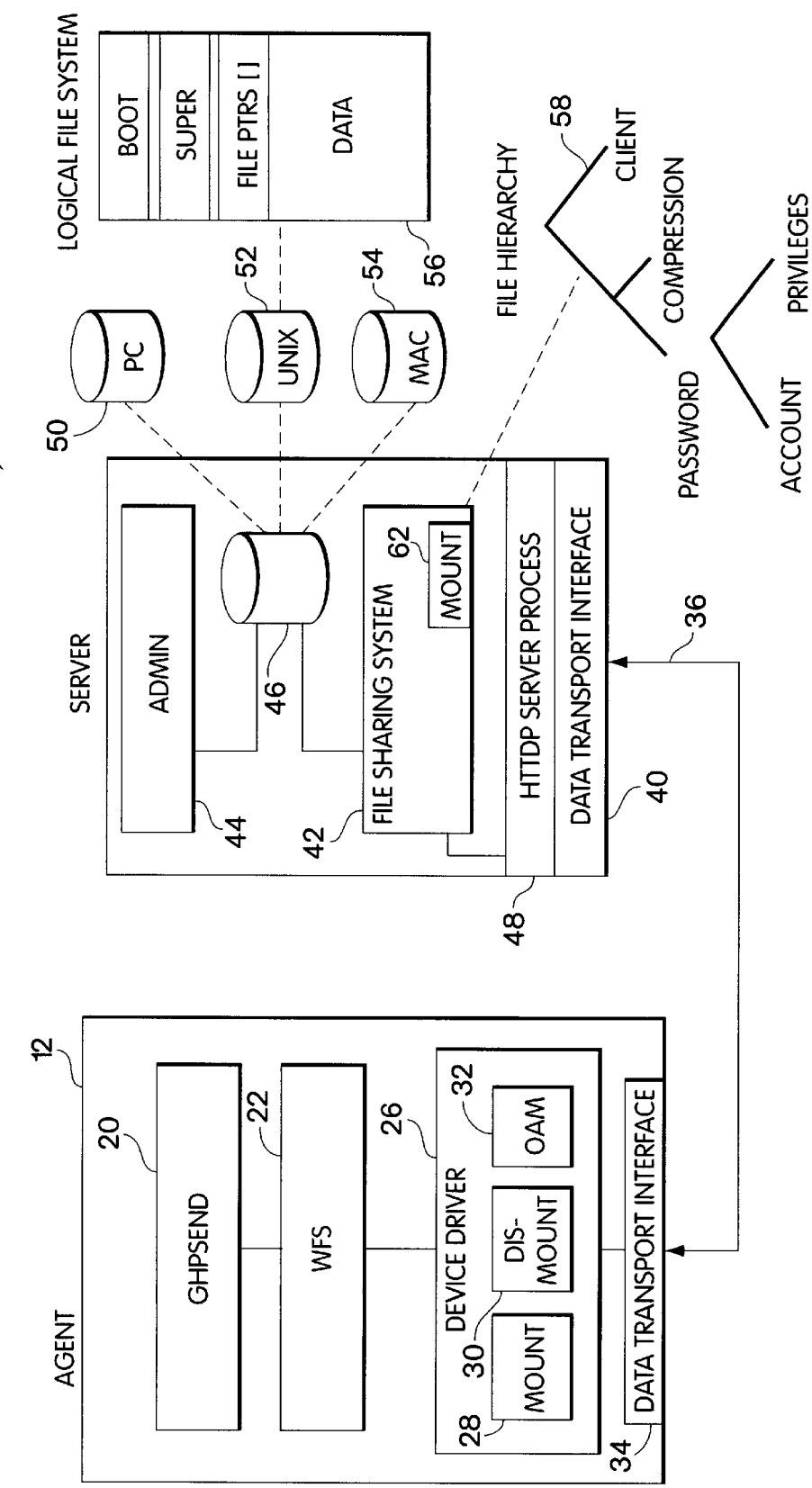
FIG. 2 illustrates in greater detail the system illustrated in FIG. 1.

FIG. 2 depicts in more detail the system 10 of FIG. 1, and depicts system 10 before the client 12 has requested to execute an application program stored on the server 14. FIG. 2 depicts that system 10 that includes the client element 12, the server element 14, a handle collection element 20, a file system 22, a device driver 26, a disk mount element 28, a disk dismount element 30, an organization and management element 32, a data transport interface 34, a transmission path 36, a second data transport interface element 40, a file sharing system 42, an administration program 44, a memory element 46 having a PC partition 50, a Unix partition 52 and a Mac partition 54, wherein at least one of the partitions includes a logical file system such as file system 56, and further including a file hierarchy structure 58 of files accessible to the server 14.

FIG. 2 depicts each functional block as an element of the system 10. However, it will be apparent to one of ordinary skill in the art of computer and software engineering that each element can be a software routine that operates on a data processing unit to configure the data processing unit to operate as the device depicted as system 10 or as a subsystem of the system 10. Moreover, it will be apparent to one of ordinary skill in the art of computer and software engineering that the functional blocks depicted can be combined elements of hardware and software that operate to implement the functions of the system 10.

As depicted in FIG. 2, the client 12 includes a data transport interface element 34, which typically is a TCP/IP interface suitable for establishing connections to an Internet site. The browser program process running on the client 12, such as the Netscape Internet browser, interfaces with the TCP/IP data transport interface element 34 to transfer data under the TCP/IP protocol to the server 14. Similarly, the handle collection element 20, the mount element 28, the dismount element 30, and other elements of the system 10 of the invention employ the TCP/IP data transport interface element 34 to transfer data and commands between the client 12 and the server 14. The interface element 34 can be any conventional Internet protocol interface, such as any program that follows the Winsock protocol for interfacing Windows operating system programs to the Internet, such as the Trumpet Winsock TCP/IP data transport interface program. However, it will be apparent to one of ordinary skill in the art of computer engineering that any system suitable for establishing a connection to a site on the Internet can be practiced with the present invention without departing from the scope thereof.

In the depicted embodiment, the server element 14 also includes a TCP/IP data transport interface 40 which connects via the transmission path 36 to the data transport interface 34 of the client element 12. The data transport interface 40 transports data and control information to and from the server 14 thereby providing a transport layer for supporting the file sharing system 42 and the administration program 44. The development of servers that include integrated transport layer protocols is well known in the art of computer engineering and any integrated transport protocol layer that allows for the exchange of data between the client 12 and the server 14 is suitable for practice with the present invention and considered within the scope thereof.

As further illustrated by FIG. 2, the depicted server 14 includes a server process 48. The server process 48 interfaces to the data transport interface 40 to connect the client 12 to the server 14. In a preferred embodiment of the invention, the server process 48 is a web server process for providing HTML pages to the client 12 in response to hypertext link requests from the client 12, as well as other elements of the system. The server process 48 is a program that implements the process of the invention described in detail hereinafter and that is constructed according to known principles in the art of computer and software engineering.

As further depicted in FIG. 2, the server 14 includes an administration program 44 which configures the server 14 for providing executable application programs to the client 12. In one embodiment, the administration program 44 includes a partition program for partitioning the memory device 46 into several logical sections, depicted as sections 50, 52 and 54, each of which can have a device name and each of which can contain a logical file system 56. The construction of such partition programs is well known in the art of software engineering.

In the embodiment of FIG. 2, the partition program creates the logical section 52 for storing data according to the Unix file system protocol. As depicted, the partition 52 includes a logical file system 56 consisting of one file, for which the file system 56 includes a boot block, a super block, an inode list that represents an array of pointers to a set of data file blocks that represent the physical location of the data on the disk 46. The files system 56 can be the conventional UNIX operating system file system and is decried in detail in Maurice J. Bach, *The Design of the UNIX Operating System*, Prentice Hall (1986). As further depicted by FIG. 2, each logical disk partition section can be employed by the administration program 14 for storing different types of computer files according to different logical system file protocols such as DOS, UNIX, VAX, or any other file system protocol wherein each logical disk section includes a logical file system 56 that provides to a program loader, or the device driver that communicates to a program loader, the low level information representative of the physical disk location on which it is stored the files of the associated disk partition.

In a preferred embodiment of the invention, the administration program 44 includes a partition subroutine that creates each logical section 50, 52, and 54 to provide a file system of computer files that can contain application programs for running on any type of client 12 that may connect to the Internet site. Such subroutines are well known in the art and any suitable subroutine or operating system call can be employed by the invention. Specifically, the administration program can be employed to subdivide the disk 46 into logical sections for each different type of client 12. Typically, the type of client is determined by the type of operating system the client runs as well as the type of processor employed by the client 12. Each client 12 would provide the server 14 with a client-type signal that allows the server 14 to determine which logical section of the disk 46 maintains files suitable for that particular client. For example a client 12 that operates under the Unix operating system, can access the files stored under logical section 52; a 486 pc compatible running DOS would access logical section 50. The administration program 44 that implements the process of the invention can be constructed according to well known principles of software engineering as a software module, such as a complied C++software module, that employs system calls to the server operating system, such as the UNIX operating system. However, it will be apparent to one of ordinary skill in the art of computer and software engineering that any structure that implements the function of the administration program can be practiced with the present invention without departing from the scope thereof.

In a further preferred embodiment of the invention, the administration program includes a file access control program that determines as a function of a client privilege signal, the access rights available to the client 12. In one embodiment, the file access control program includes a database of client identification signals. In this embodiment, the management program 32 includes a client management program that provides a client identification signal that uniquely identifies the client 12. The file access control program includes a database of client identification signals and further includes a client privilege field for each client identification signal. The file control program employs the client privilege field to determine the file access rights of the client 12. The file access control program provides the file access rights to the administration program 44 which can determine the proper file system or disk partition to make available to the client 12.

Accordingly the administration program can provide a licensing and security system for the system 10. It will be apparent to one of ordinary skill in the art that any file access control program suitable for controlling the files that are mounted into the server file system hierarchy 58, or that controls the copy of the server file pointers provided to the client 12, including password systems, on-line charge systems, or any other such system for controlling file access rights can be practiced with the present invention without departing from the scope thereof.

In a further embodiment of the invention, the management element 32 includes a client management element that provides to the server 14, along with the client-type signal, a client file having information signals representative of the characteristics of the client. These characteristics can include the memory size of the client, the available program memory, the system configuration, including the config.sys file, win.ini file, configuration files for local applications and the file names of one or more of the systems stored on the client 12. The administration program 44 employs this information to determine which files to provide the client, as well as for other conventional management function.

In the depicted embodiment, the administration program 44 is separate from the server process 48, however it will be apparent to one of ordinary skill in the art of computer and software engineering that the administration program can be implemented as part of the server process 48.

The file sharing system 42, depicted in FIG. 2, communicates with the memory device 46 and allows the server element 14 to read and write information, such as computer files, to and from the memory device 46. The file sharing system 42 further maintains the file hierarchy 58 for the server 14 to thereby provide the logical structure for accessing and managing computer files which are stored as data blocks within the memory device 46.

The file sharing system includes a mount procedure 42 that connects a file system in a specified section of a disk into the existing server file system hierarchy 58. Moreover, the mount procedure call 42 can convert an operating system specific path name into a file handle. A file handle, as is known in the art, is a data-address structure that the server 14 can employ to communicate with the client 12. The file handle acts as a file pointer to a file of the file system. Typically, the file handle, or file pointer, is a system unique 32 bit number that identifies to the server 14 a file when the file is first opened and provides thereafter a handle the server 14 can employ to access the file pointed to by the handle. In one embodiment, the file sharing system 42 is the NFS System developed by Sun Microsystems of California that creates vnode arrays of file pointers for sharing file systems on a Unix platform. However, it will be apparent to one of ordinary skill in the art that any file sharing system that can mount a file system and generate a file handle that acts as a file pointer to the files of the file system, can be practiced with the present invention without departing from the scope thereof.

The client 12 includes a device driver 26. The illustrated device driver 26 controls a dynamic mount procedure 28, a dynamic dismount procedure 30 and one or more organization and management procedures 32. As described in greater detail herein after, to access an application program stored at the Internet site, the device driver 26 activates the dynamic mount procedure 28. The mount procedure 28 creates a remote procedure call that is passed to the data transport interface and transported to the server 14.

Figure 3:
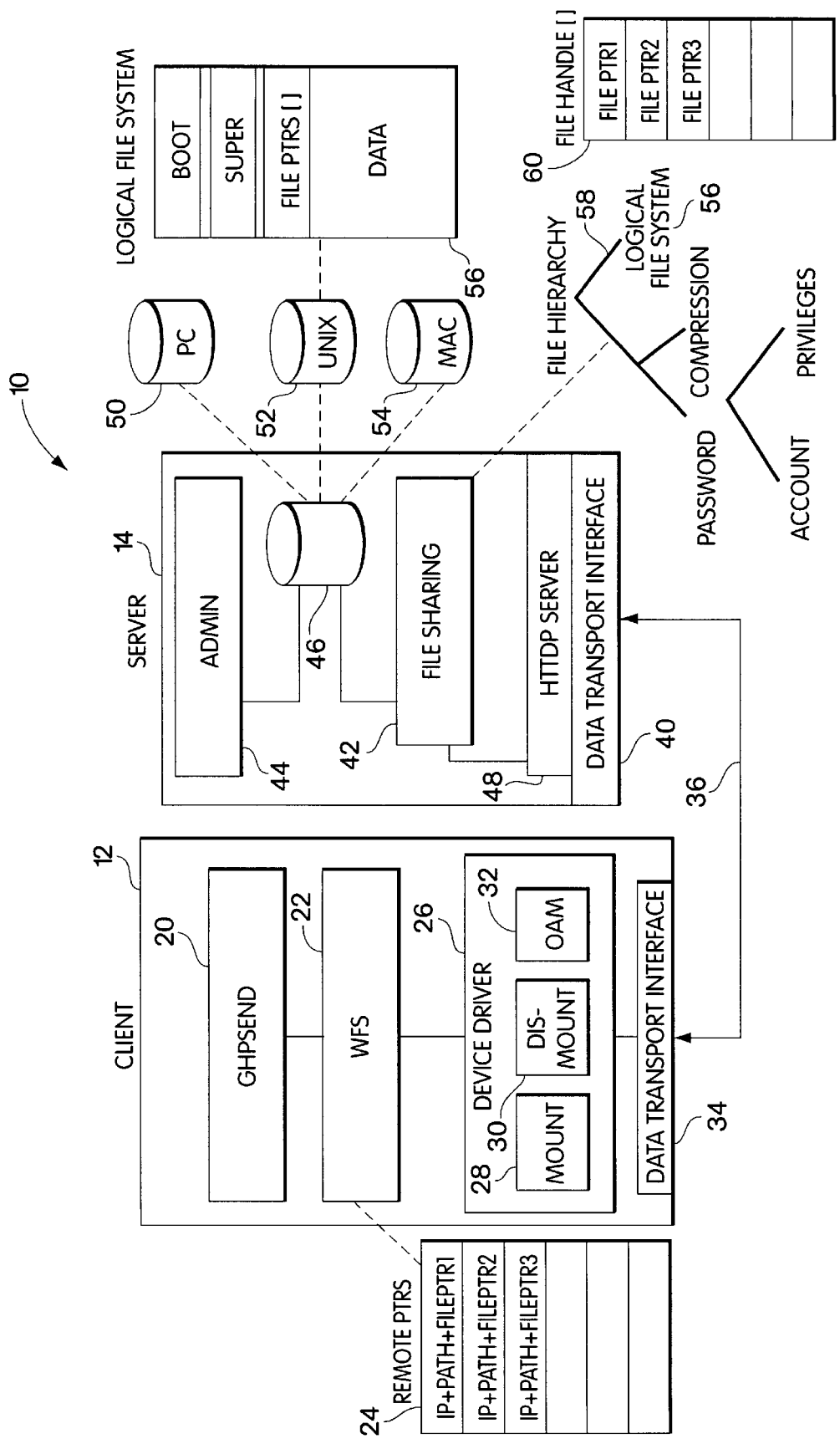
FIG. 3 illustrates the system of FIG. 1 having a mounted logical disk partition.

With reference to FIG. 3, which depicts the system 10 after the client 12 has selected an application program for execution, the system 10 can be further explained. As depicted in FIG. 3, the system 10 includes the elements of FIG. 2 and the further elements of a server array of file pointers 60, a file hierarchy 58 that includes the logical file system 56 mounted at the client mount point of the file hierarchy 58 and an array of remote file pointers 24 that are maintained by the file system 22 of the client 12. The system 10 generates the server array of file pointers 60 and the array of remote file pointers 24 in response to the client 12 requesting to execute an application program stored within the logical file system 56.

In one embodiment of a process according to the invention, the client 12 employs the web browser program to contact a server process 48 running on server 14. The browser program provides the server process 48 with a client-type signal that indicates to the server process 48 the system type of client 12 and the file system protocol employed by client system 12.

In the depicted embodiment the server process 48 provides the admin program 44 with the client-type signal. The admin program 44 employs the client-type signal to determine a compatible logical file system that is to be provided to the client 12. In one embodiment, the admin program 44 determines the proper file system to be provided to the client 12 and provides the server process 48 with a pointer to a URL document that includes directory information signals that describe the directory structure of the file system 56 that is compatible with the client 12 and that will be made accessible to the client 12. In a preferred embodiment of the invention, the admin program 44 provides the web server 48 with an HTTP URL that provides a hypertext page which graphically depicts the directory information signals. Preferably the admin program 44 includes a page element that has a hypertext link program for generating a hypertext signal which represents the directory information signals as graphical icons which are hypertext links to further URL documents that provide further detail of the directory structure of the logical file system 56.

The server process 48 transports to the agent 12 the directory information of the available logical file system 56 and further provides a data file that includes the Internet network address of the server 14 and a path name to the file system 56.

The connection element 20 receives the data file provided by the server process 48 and extracts the network address signal and the path name signal. The collection element 20 employs the network address signal and the path name signal to generate the array of remote file pointers 24 and to provide the mount procedure 28 with the necessary arguments to mount a file system such as system 56. Typically, the connection element includes a concatenation program to concatenate the address and pathname information to generate the proper mount point. In alternative embodiments, the connection element receives the proper mount point and file system name from the administration program. In a further step of the process, the browser program of client 12 displays to the client user a graphical depiction of the logical file system 56.

In one embodiment of the invention, the client user can request to execute an application program identified within the file system 56 by clicking on an application program. In response to the action of the user, the connection element 20 passes the necessary arguments to activate the mount procedure 28 that generates a remote procedure call directing the server 12 to mount the logical file system 56 that contains the application program requested by client 12, into the file hierarchy 58.

In one embodiment, the connection element 20 receives a data file from the server process 48 that provides the ip address of the server and the pathname to the files available to the client 12. In an alternative embodiment, the connection element 20 initiates a call to a port of the server process, such as well known port 80, that provides address information of the server 14. In one example, the client 12 can select to execute the application program XLANDER.EXE. Once the collection element has determined the network address and path name, the connection element 20 can activate the mount procedure to dynamically mount the file system that contains the file XLANDER.EXE. One such mount procedure 28 is understood from the following psueudo code.

```
int mount_fs(mntp)
struct mntent *mntp;
{
int error;
/* The mount procedure makes a MOUNT_TRAP call. This calls the MOUNT_TRAP routine which is call to an operating system library. Such function calls are provided, as one example, by the Win library or the SYS library. You could also write your own mount function. */
    error=MOUNT_TRAP(type, mntp. flags, mnt_data);
    if (error<0) {
        plog(XLOG_ERROR, "mount failed on % s: ermoo=% d",
            mntp→mnt_dir, ermo);
        return (-1);
        }
}
main (argc, argv)
int argc;
char **argv;
{
/* The main routine recieves the host name and the mount point name from the collection program */
hostname=argv[1];
mp_name=argv[2];
/* the main routine then reformats the name of the file system that is to be mounted to format the file name for the web server process. Typically the file extension ":wwfs" is added to denote the world wide web file system */
fs_name=compute_fs_name(argv [1]);
/* the main routine then packs the file system name, the mount point name, a mount type field into a structure. */
mntp→mnt-dir =mp_name;
rntp→mnt_fs_name =fs_name;
mntp→mnn_type=MNTTYPE_WWFS;
/* The main that issues calls a mount file system procedure that operates on the mntp structure*/
ret=mount_fs(&mntp, flags, (caddr_t) &nfs_args, 1, MOUNT_TYPE_NFS);
return ret;
}
```

As illustrated by the above pseudo code, the mount procedure 28 receives from the collection element 30 two arguments that represent the file system to mount and the mounting point for the file system. The mount procedure 28 can then create a remote procedure call for the file sharing system 42 to activate the mount procedure 62. The mount procedure 62 mounts into the server file hierarchy 58 the file system, such as file system 56, which includes the executable program file for the XLANDER.EXE application program. The mounted file system can now be accessed.

The file sharing system 42 is a program element that creates an array of file pointers 60, depicted as fil ptr1-n, that represent the locations of the disk 46 that contain the executable code for XLANDER.EXE. In one embodiment, the server process 48 provides the client 12 with a copy of the file pointers. However, any system for providing the client with a copy of the file pointers 60 can be employed by the present invention without departing from the scope thereof.

Figure 4:
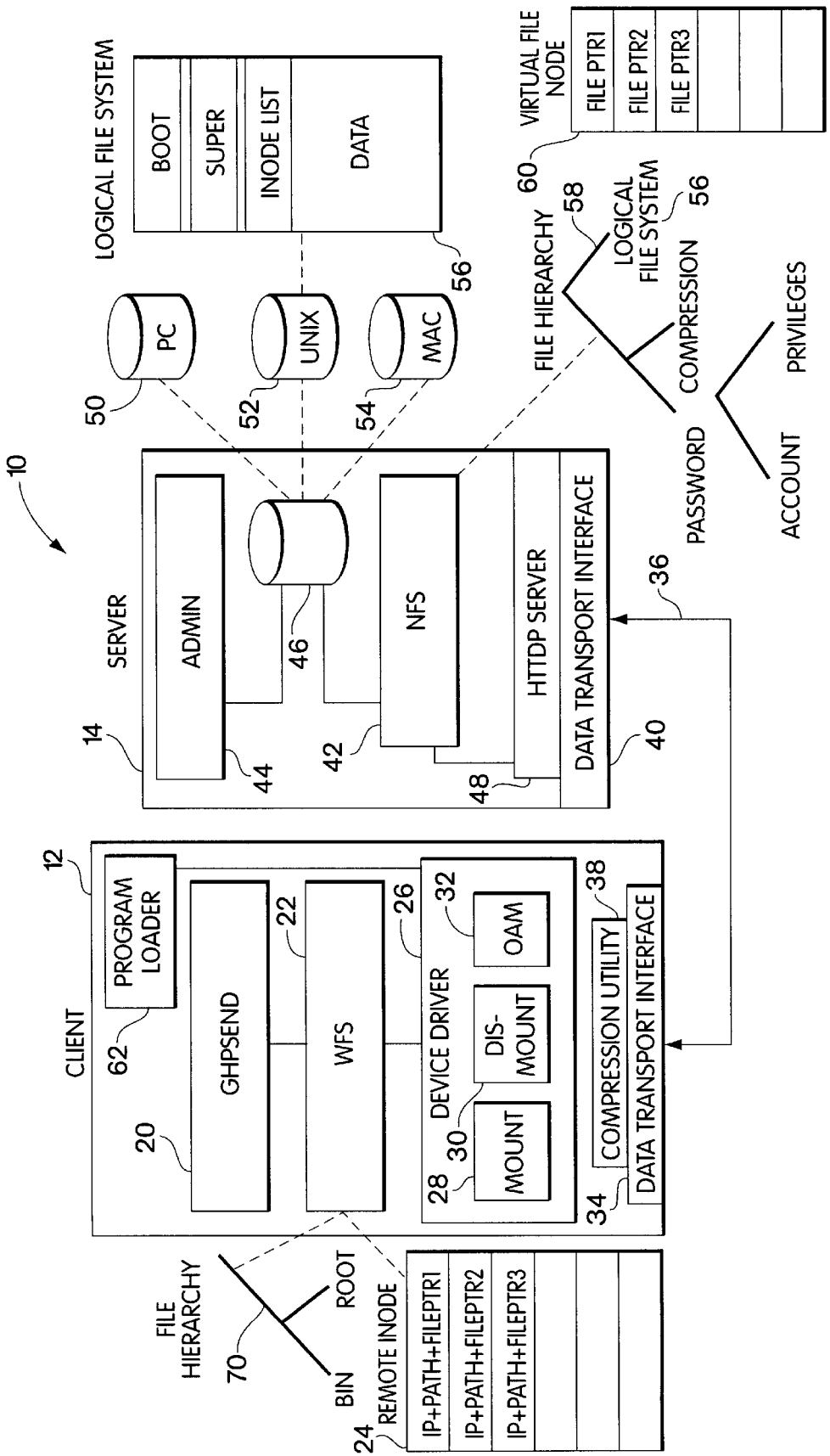
FIG. 4 illustrates the system of FIG. 1 having an array of file pointers integrated into the hierarchy of the client file system for providing the client program loader with entry points to application programs stored at the Internet site.

As depicted in FIG. 4, the connection element 20 opens a file having the copy of the file pointers 60 and generates the array of remote file pointers 24. Each remote file pointer 24, depicted as IP+PATH+FILEPTR, is a handle, through the mounted disk partition, and to a physical location on the mounted disk 46 that can be employed by the client 12 as access points to the physical location of the disk 46 that contains the executable code for the XLANDER.EXE. In a preferred embodiment of the invention, the array of remote file pointers is provided to the client 12 by integrating the array of file pointers into the file hierarchy of the client 12. It will be understood that any connection element suitable for providing a remote file pointer to a file system can be practiced with the invention, including connection elements that employ a concatenation routine for forming pointers by concatenating a server address signal with a pathname signal and a file pointer signal, such as a connection element that forms a string WWW.DTCORP.COM:USR/LOCAL/STORE/XLANDER.EXE, where WWW.DTCORP.COM is a server address representative of an ip address, USR represents the disk 46, and /LOCAL/STORED/XLANDER.EXE represents the pathname signal.

FIG. 4 further depicts that client 12 can include a program loader element 62. The program loader element depicted in FIG. 4 connects to the device driver 26 and employs the device driver 26 to access the executable file selected by the user of client 12. The device driver 26 searches the file hierarchy of the client 12 and identifies the remote file pointer which points to a first block of code of the selected executable program. The device driver 24, which interfaces with the data transport interface 34, accesses the file block of executable code by requesting a transfer of the file block from the disk 46. In a preferred embodiment, the program loader runs the process within a window in the browser process. In one embodiment, the client 12 was configured to run the WINDOWS 95 operating system and employed the program loader supplied under that operating system. However, it will be apparent that any program loader suitable for employing file pointers for loading executable code, can be employed with the present invention without departing from the scope thereof.

FIG. 4 further depicts a compression program 38 for compressing data being transferred across the path 36. In this embodiment, the server process 48 also includes a compression routine for compressing and decompressing data transmitted by the data transport layer. In one embodiment, the invention provides a compression program that performs a huffman encoding procedure, however it will be apparent to one of ordinary skill in the art that the substitution of alternative encoding processes does not depart form the scope of the invention. In a further preferred embodiment, the system 10 includes a caching system that allows the server 14 to cache data file blocks read from the disk 46, and being prepared for transport to the client 12. The caching system can be any conventional caching system that stores in a high access speed memory a buffer of data blocks for transfer to the client 12.

Figure 5:
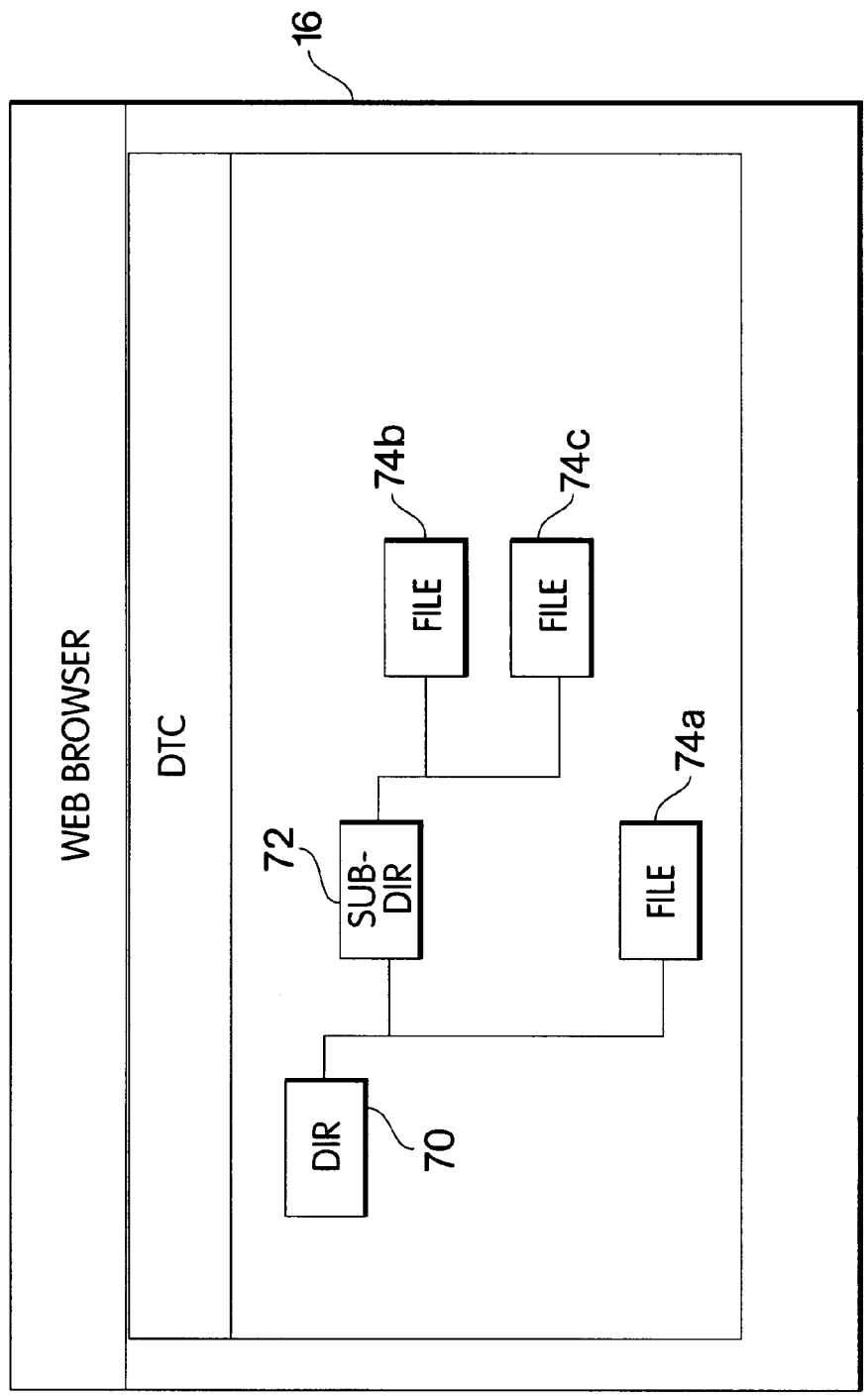
FIG. 5 depicts a graphical interface that provides a directory structure for accessing and executing application programs according to the system of FIG. 1.

FIG. 5 depicts a graphical interface 16 that provides a directory structure for X in executing application programs according to the system of the invention. As depicted in FIG. 5, System 10 provides a graphical user interface 16 that displays within the window of the browser program 78. In the depicted embodiment of the invention, the graphical user interface 16 is an HTML hyperlink page provided by the Web Server Process 48 and which includes hypertext links that graphically illustrate directory information signals that show the file system structure of a file system 56 that has been mounted into the file hierarchy of the server 14.

As illustrated in FIG. 5, the graphical user interface 16 provides the hypertext links as graphical icons that describe directory primitives, such as directory structures, sub directory structures, file structures, disk structures, or any other common file system structure. FIG. 5 illustrates one graphical file structure that includes a directory icon 70, a sub directory icon 72, and file icons 74A, 74B and 74C.

In a preferred embodiment of the invention, each icon is a hypertext link to a further HTTP URL which requests the Web Server Process 48 to download an additional HTML page that provides further information as to the directory structure of the mounted file system 56. Although the graphical interface 16 depicted in FIG. 5 is a preferred embodiment of the invention, it will be apparent to those of ordinary skill in the art that systems and processes according to the invention can be practiced without such graphical interface without departing from the scope thereof. Moreover, the construction of an HTML server process that provides multiple links to URL sites is well-known in the art of computer engineering, and any modifications, subtractions, or additions to the interface 16 depicted in FIG. 5 is deemed to be to the scope of one of ordinary skill in the art. It would not depart from the scope of the invention.

Figure 6:
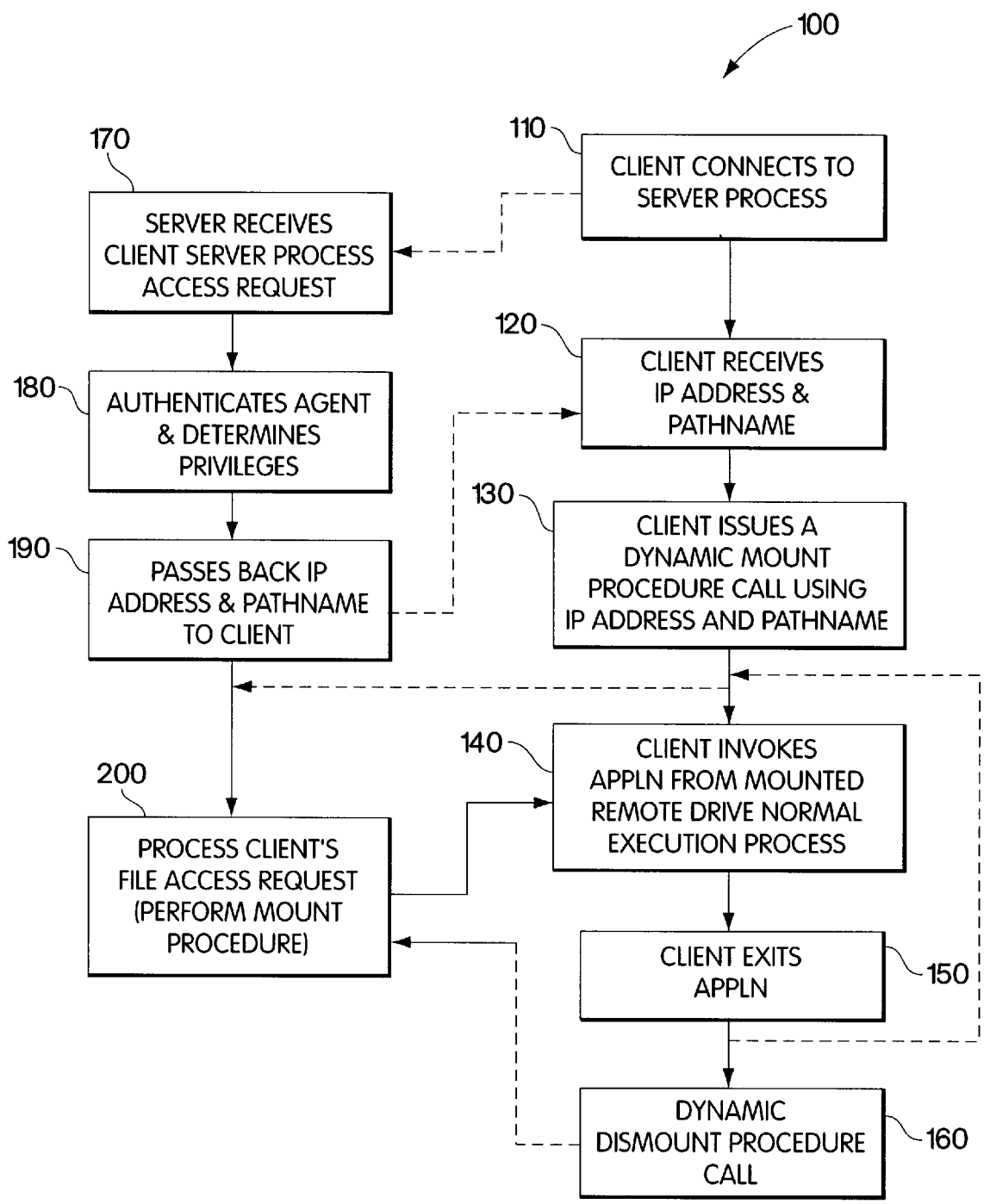
FIG. 6 is a functional block diagram of a process according to the invention for executing application programs from a Web Internet site.

FIG. 6 depicts a functional block diagram that illustrates one process according to the invention for allowing a client to connect to an Internet server for executing applications therefrom. As depicted in FIG. 6, the process according to the invention can be understood as two processes, a first running on a client computer, and a second running on the server computer, which operate in part independently from each other. FIG. 6 depicts the server process in the left hand portion of the figure. The server process includes steps 170, 180, 190 and 200. The client process is depicted on the right hand side of FIG. 6 and includes steps 110, 120, 130, 140 150 and 160.

The process 100 begins with the client process step 10 that connects the client to the Web server process. As depicted in FIG. 6, step 110 of the client process causes the server process to perform step 170, which includes receiving the Web server access request to access a file. The server process continues to step 180 which is an optional step, where the server 12 authenticates the client and determines the access privileges afforded to their client by examining a client ID signal and a client privilege signal that are transmitted by the client to the server. After optional step 180, the server process continues to step 190 and passes back to the client the IP address signal and the path name signal.

In a preferred embodiment of the invention, step 190 also includes the step of passing back to the client an HTML page that graphically depicts the available application programs. As illustrated in FIG. 3, a client process proceeds to step 120, where the agent receives the IP address and the path name. Upon receipt of the IP address signal and the path name signal, the client process proceeds to step 130, and employs the IP address signal to generate a dynamic mount request. In a preferred embodiment of the invention, the client generates the dynamic mount request by a client activating a hypertext link that provides a dynamic mount request to the Web server process of the server 14.

As further depicted by FIG. 6, the dynamic mount request of the client process is passed to the server process and the server process proceeds from step 190 to step 200. In step 200, the server process processes the client's file access request and performs the mount of a remote system disk that contains the application file requested by the client. As described above, the process step 200 includes the step of generating an array of server file pointers that act as file handles to the data blocks of the application program.

As depicted in FIG. 6, step 200 passes a copy of the array of server file pointers to the client process which proceeds to step 140 and invokes the application from the mounted remote drive. In step 140, the client process follows the normal execution process of the client system by invoking the program loader to load file blocks pointed to by a remote array of file pointers which are generated by the client process as a function of the IP address, path name signal, and server file pointers.

As depicted in FIG. 6, the client process proceeds from step 140 to step 150 after execution of the application and exits from the application. As further depicted by FIG. 6, the client process can proceed to step 160 where it issues an optional dynamic dismount drive request that transfers control of the process 100 to the server process which process the client's dismount request and removes the mounted drive from the server system file hierarchy. The dynamic dismount request creates a remote procedure call for the file sharing system 42 to dismount the specified file system, typically the file system mounted by the mount procedure 28. The construction of the dismount procedure 30 is similar to the mount procedure 28 described above.

As further depicted by FIG. 6, the process 100 can continue to operate after step 150, allow the client 12 to select a next application program for executing.

It will thus be seen that the invention efficiently attains the objects set forth above, among those made apparent from the preceding description. It will also be understood that changes may be made in the above construction and foregoing sequences and operations without departing from the scope of the invention. For example, the invention can be understood to include primitives embedded into an application program or a programming language, that allow the application program or the programming language to mount a remote disk and execute application programs from that disk over an Internet connection. As an example, it will be understood that an application program that include the functionality to communicate to a data transport layer, can employ the systems and process of the invention to allow a user to access and execute, from within the application program, a second program located on a disk linked to a server site. Furthermore, it will be understood that an operating system can be adapted to include the systems and process of the invention.

It accordingly is intended that all matters shown in the accompanying drawings be interpreted as illustrative rather than in any limiting sense. It is also to be understood that the following claims are intended to cover all of the generic and specific features of the invention as described herein, and all statements of the scope of the invention which as a matter of language, might be said to fall there between.

We claim:

1. A process for allowing a client to connect to a server of an Internet site for executing an application program stored on a disk linked to the server, comprising the steps of providing a data transport interface for connecting to said server, transporting from said server a server address signal representative of a network address of said server, and a path name signal representative of a file system that includes the application program, generating a mount request, as a function of said path name signal, and transporting said mount request to said server for directing said server to provide an array of server file pointers that point to a file descriptor representative of said file system that includes the application program, generating an array of remote file pointers, as a function of said server address signal, said path name signal and said array of server file pointers, providing said array of remote file pointers to a program loader element operating on said client, and directing said program loader to select one of said remote file pointers and to transport from said disk to a local program memory element, a file block associated with said selected remote file pointer.

2. A process according to claim 1, including the further step of transporting to said server, a client-type signal representative of a file system protocol employed by said client.

3. A process according to claim 1, including the further step of providing said server with an administration program for storing a file system of computer files on said disk according to a select file system protocol.

4. A process according to claim 3, wherein said step of providing said server with an administration program includes the step of providing means for storing computer files according to one or more of a DOS, UNIX, VMS, WINDOWS, WINDOWS 95, WINDOWS NT, OS/2, SYSTEM 7 file system protocol.

5. A process according to claim 3, wherein said step of providing an administration program includes the step of providing file directory means for generating directory information signals representative of said file system of computer files and for transporting said directory information signals to said client for providing a file directory of the computer files available to be accessed by said client.

6. A process according to claim 3, including the further step of providing said file directory means with page means for generating a page signal representative of said directory information signals.

7. A process according to claim 1, including the further step of transporting to said server a client privilege signal representative of a preassigned access right granted to said client.

8. A process according to claim 7, including the further step of providing said server with a file access control program for determining, as a function of said client privilege signal, a set of file systems of computer files available to be mounted by said client.

9. A process according to claim 1, including the further step of providing said data transport interface with data compression means for compressing said file blocks being transported from said disk.

10. A process according to claim 1, including the further step of providing said server with caching means for caching a plurality of said file blocks from said disk.

11. A process according to claim 1 wherein said step of providing a data transport interface includes providing a TCP/IP data transport system.

12. A process according to claim 1, further including the step of generating a request to dismount the file system.

* * * * *